Jan. 3, 1961     A. C. SCAVULLO     2,967,134
PROCESS OF PRODUCING COOKING UTENSILS

Original Filed June 15, 1954

INVENTOR
Angelo C. Scavullo
BY
HIS ATTORNEY

United States Patent Office 2,967,134
Patented Jan. 3, 1961

2,967,134

PROCESS OF PRODUCING COOKING UTENSILS

Angelo C. Scavullo, Jamaica, N.Y., assignor to Legion Utensils Co., Inc., a corporation of New York Original application June 15, 1954, Ser. No. 436,915. Divided and this application Sept. 10, 1958, Ser. No. 760,250

1 Claim. (Cl. 204—25)

My application for patent is a division of my copending U.S. application Ser. No. 436,915, filed June 15, 1954, and now abandoned, entitled Cooking Utensil and Method, and the invention relates to cooking utensils and vessels which provide superior heat conductivity and resistance to corrosion. As well, it relates to a method and apparatus for making such utensils and vessels.

An object of my invention is to provide an inexpensive and highly durable utensil which can be manufactured in a minimum number of operations with the elimination of any seams or welts on the finished product and with a high heat conductivity so that applied heat will evenly distribute throughout the utensil so as to eliminate scorching of food, due to local hot spots, and provide uniform heating of the food being cooked therein.

Another object is to produce a cooking vessel with exceptional resistance to corrosion by the acids, bases and salts of foodstuffs being cooked therein and whose surfaces may be easily cleaned, which, while presenting an attractive and pleasing appearance, is impervious to the foods, and which will eliminate the contamination of foods cooked therein by the previously cooked foods.

A further object of my invention is to provide a simple, direct, efficient and economical method and apparatus for making such a utensil.

Other objects and advantages, in part, will be obvious and in part pointed out hereinafter during the course of the following description.

My invention accordingly resides in the features of construction, combination of elements, and arrangements of parts and in the several steps and the relation of each of the same with one or more of the others, the scope of the application of all of which will be more fully set forth in the claim at the end of this specification.

In the accompanying drawings.

Like reference characters refer to like parts throughout the several views of the drawing.

Figure 1:
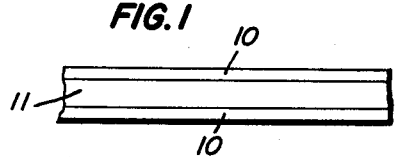
Fig. 1 is a side view of the composite metal sheet used in my invention.

As conducive to a clearer understanding of certain features of my invention, it may be noted at this point that stainless steels, as for example the austenitic chromium-nickel stainless steels and especially those containing 10% to 25% chromium and 7% to 15% nickel and the remainder substantially all iron, with as low a carbon content as commercially possible, have come into widespread use as a material for the construction of cooking utensils because of their superior resistance to the corrosive attack of foods such as fruit and vegetable acids or corrosive salts. It also has a quality of responding easily to cleaning agents. A serious objection to its use, however, is that heat applied to one portion of a pan does not diffuse to the other portions of the pan, but remains concentrated in the one portion. Localized hot spots are created. As a consequence, food on those portions will be burned and food in other portions will not be cooked, unless the mass of food is continually stirred.

It has been proposed to overcome the heat distribution problem by making a utensil of stainless steel on the inside and thick copper on the outside, as copper possesses excellent heat conductive characteristics. Utensils of this character, having the two metals tightly fitted together and spot-welded, were not satisfactory because of cracks forming between the metals permitting the entrance of water and resultant warping and blistering of the metal. Likewise, stainless steel utensils with an electroplated copper coating on all the outside surfaces of the utensil, with a subsequent build-up of the electrodeposited layer by means of spraying on hot copper, were not entirely satisfactory because of warping.

In the prior art it also has been proposed to limit the amount of copper employed on solid stainless steel utensils by depositing a layer of copper on the bottom and on a portion around the sides a short distance from the bottom leaving the stainless steel surface on the major portion of the utensil sides. This arrangement permits proper distribution of heat throughout the copper-plated portion, but leaves improper and unequal heating effects in the unplated portion.

In another approach to the problem, the use of copper is entirely avoided and the vessel is constructed entirely from a composite metal sheet comprising a layer of stainless steel on the top and bottom of the sheet with a layer of mild steel in between the two. With this construction the stainless steel layers offer corrosion resistance while the core of mild steel offers heat distribution. This construction, however, leaves much to be desired in the matter of uniform cooking.

Accordingly, the object of my invention is the production of a cooking utensil that is of low cost with exceptional durability and wear-resistance properties and excellent heat distribution characteristics, while at the same time presenting an attractive appearance for the necessary consumer acceptance.

Referring now more particularly to the practice of my invention, I produce a cooking utensil from composite metal sheet which is rolled from stacked sheets composed of two stainless steel layers, preferably what is known as 18–8 chrome-nickel stainless steel, with an internal mild steel layer. The composite sheet is deep-drawn to inexpensively produce deep-drawn vessels of the desired configuration.

In the drawn form, therefore, the vessel comprises inner and outer layers of stainless steel.

I now cut a shallow V-shaped groove into the arcuate portion at the outside bottom edge of the partially formed vessel to sharply define the areas of bottom and side-wall.

The bottom area now is processed to further improve the heat-conducting characteristics of the vessel as a whole. Copper is electrodeposited on the bottom of the vessel and on the bottom edge of the shallow V-shaped groove. A balanced heat conductivity between bottom and side-walls is thereby provided at reasonable cost; the copper utilized is a relatively small amount.

As specifically illustrative of the practice of my invention, I employ composite sheet metal, shown in Fig. 1, which consists of three layers of steel rolled into an overlying relationship. The top and bottom layers 10 are of stainless steel, preferably of the type known to the trade as 18-8, a composition of 18% chromium, 8% nickel and the remainder low-carbon iron. And the intermediate layer 11 is of mild steel. Each of the outer layers is substantially thinner than the intermediate layer of mild low-carbon steel. Actually, best results are had where the thickness of the intermediate layer amounts to some 1½ to 5 times the total thickness of the inner and outer layers. The figure is critical because with lesser thicknesses of mild steel there is inadequate heat-distribution and, with greater thicknessses, warping is encountered.

In making my utensil the tri-ply sheet is purchased from the mill in sizes and thicknesses desired. It will be noted, at this point, that some variation in the gauge of the material used can be utilized as it may be desired that the utensil be of the heavy duty type with a thicker gauge such as that used in hotels and the like, or possibly for the domestic customer where a light, convenient utensil of a lighter gauge is desired. In a preferred form of my invention the proportions of the layers, regardless of the gauge, are 20% of the total thickness in each of stainless steel layers and 60% in the mild steel layer.

Figure 2:
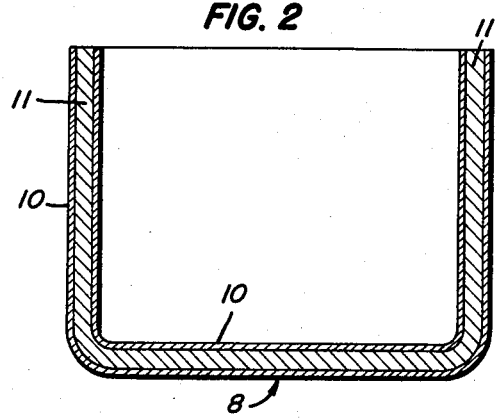
Fig. 2 is a cross-sectional view of my utensil deep-drawn from the sheet of Fig. 1.
Figure 3:
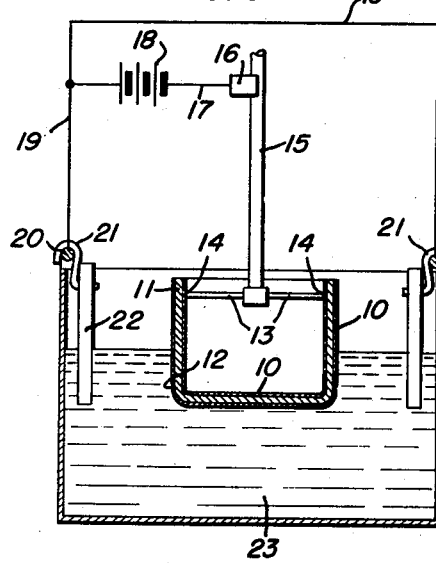
Fig. 3 is a representation of the apparatus employed to carry out one step of forming my utensil.

After being cut to size the sheet material is deep-drawn to provide a roughly formed cooking utensil of the desired configuration. By this operation a utensil body is produced free of seams or welts where dirt or cleaning compounds might lodge or leaks might start. One type of deep-drawn utensil body is shown in Fig. 2. The utensil has inside and outside layers of stainless steel 10—10, and an internal layer 11 of mild steel throughout the body.

Figure 4:
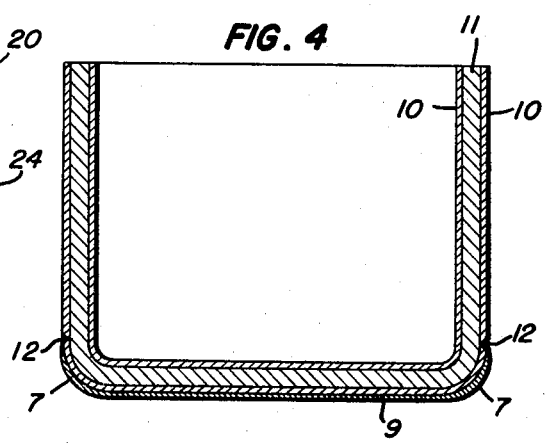
Fig. 4 is a cross-sectional view of the utensil of Fig. 2 after the copper-plating of a portion.

I now cut a shallow peripheral V-shaped groove 12 in the vessel outer surface as shown in Fig. 4 along the arcuate portion of the vessel which constitutes the outside bottom edge. The groove is preferably machined on a line which is generally above the center of the arcuate portion on its outer surface 10 and below the start of the straight side-wall portion. This groove defines the upper extremity of a portion of the vessel to which copper is to be deposited, as will be explained hereinafter.

I roughen the entire bottom of the outside surface 10 of the vessel below groove 12 by grinding or abrading on machines or belt. The abraded surface is then passivated by immersion in a bath of sulphuric acid. In this manner the surface is prepared for electroplating.

I now coat the outside surface of the vessel above groove 12 with a beeswax or a similar substance to prevent the depositing of copper thereon. This practice leaves exposed for electroplating that area in which I find that the highest amount of heat conductivity is required.

The vessel is put into position for electroplating in tank 24, either still plating or plating wherein the vessel is slowly rotated in the plating bath. For plating with rotation of the work a copper bar 13 is secured to the inside of the vessel as at points 14 to establish good electrical contact, the bar in turn being mechanically and electrically connected to a copper shaft 15 which is adapted to be rotated by some suitable means not indicated in the drawing.

Shaft 15 is electrically connected by way of a copper spring contact brush 16 and lead 17 to the negative terminal of a source of direct current electrical energy such as a storage cell 18. And the positive terminal of the source 18 is connected by lead 19 to a metallic rod 20 which is secured in a position near the inside tip edge of the tank 24, but insulated therefrom.

Copper bars or plates 22 suspended from the rod 20 on metallic hooks 21 in my plate apertures provide an electrical connection between the rod 20 and the plates 22, the latter forming the anodes of an electrolytic cell. A suitable electrolyte 23 is contained in the tank 24 at a level high enough to completely submerge the portion of the vessel that is desired to be plated. This electrolyte is preferably a copper sulphate solution containing a small amount of sulphuric acid, but other solutions may be used. By virtue of the connection to the negative terminal of the source 18 the vessel forms the cathode of the electrolytic cell.

In the plating operation, after all the connections are made, the vessel is rotated at the desired speed by the shaft 15. Preferably the rotation is such as to give the periphery of the vessel a linear velocity of about 6 feet per minute. Due to the electrolyte action copper is deposited on the outer surface of the stainless steel bottom below groove 12 which is not protected by the beeswax coating. The electroplating operation is continued until it builds up a layer of copper 9, as shown in Fig. 4, of desired thickness.

The method of electroplating described herein is characterized by extreme simplicity in the apparatus required and in operation. The copper coating deposited on the vessel is of uniform thickness except on a portion of the bottom edge 7, as shown in Fig. 4, where it is desirably thicker. This thickened section serves the function of thermally reinforcing the junction between the bottom and side walls. As a result, better heat conduction is provided between the bottom of the utensil to which the heat is usually applied and the side-walls. Due to the agitation of the electrolyte caused by rotation of the vessel, no gas bubbles are included in the copper coating which is deposited. The coating accordingly is dense and solid.

My rotating process of electroplating is used preferably due to its superior effect in the bonding of copper directly to stainless steel by eliminating the tendency of the copper layer to blister in use. However, the layer of copper may be applied as by still-plating where desired. In still-plating I strike a thin layer of copper on the stationary utensil by utilizing a high current density at first 80 amps. p.s.i. in the plating process and then reducing the current density to lower amount 50 amps. p.s.i.

Due to the time and current requirements for electrodepositing the copper required, it may be preferred to build up the layer 9 to desired thickness by spraying hot copper particles onto the utensil after electroplating the first copper coating. This step may be employed as desired.

In addition to the improved heat distribution had throughout the utensil body by means of the inner layer of mild steel, I find that additional advantages in heat conductivity are had with the copper layer 9. This layer gives added effectiveness to the heat distribution properties of the utensil and greatly assists in evenly distributing heat around the cooking vessel in use, especially to prevent the formation of local hot spots on the bottom which might cause burning or scorching of the food, whether in liquid or solid form.

Figure 5:
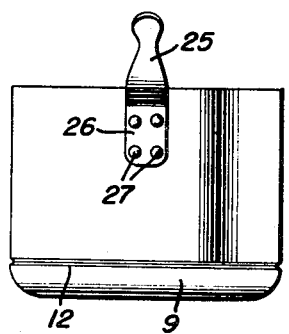
Fig. 5 shows the method of attaching a handle to the utensil.
Figure 6:
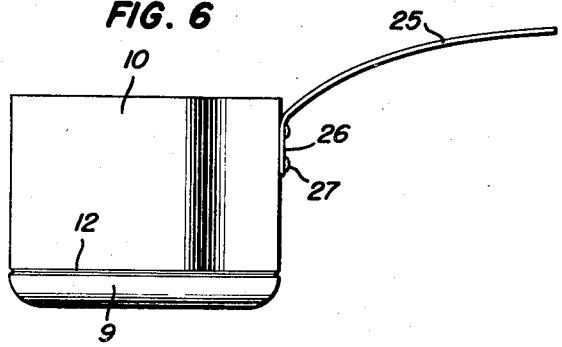
Fig. 6 is a cross-sectional view of the final form of my invention, showing the handle attached.

After the vessel has been plated it is then ready to have its handle attached. And referring now to Fig. 5, it will be seen that handle 25 has a curved and flattened lower end 26. The handle preferably is fashioned of 18–8 chromium-nickel stainless steel, although other metal of comparatively poor heat conductivity characteristics may be used. And in attaching it to the vessel its curved end 26 is held against the outside wall of the vessel 8 at a convenient location as shown in Fig. 5, and by means of a welding process, such as resistance or welding or spot-welding, is permanently secured thereto. The welded areas 27 are shown in Fig. 5. A handle attached in this manner is vastly superior in ruggedness as compared to a handle which is riveted or attached in some other like manner. Rough and constant usage will not damage either the utensil or dislocate the handle and maintenance expense is eliminated. The long lasting qualities and durability of this utensil in its final form are unexcelled.

One of the major advantages of my utensil is the highly efficient and balanced heat conductivity of the bottom and sidewalls which is had. Heat applied to the bottom is distributed over the whole bottom and side-walls with the tri-ply construction and the cooperating effect of the bottom copper layer. The food in the vessel therefore is heated uniformly. The increased thickness of copper at the junction between the bottom and sides of the vessel has been found desirable in order to better distribute the heat up the side walls from the bottom. The thickened edge portion is also desirable because a substantial thickness of copper remains on the edge after the vessel has been subjected to wear caused by the rough handling encountered in actual practical use.

The cleaning of cooking utensils made with my invention is reduced to an absolute minimum by providing the major portion of the utensil with stainless steel surfaces without sacrificing any of the excellent heat-conductivity properties. At the same time advantage is taken of the properties of stainless steel that prevent corrosion in the cooking and serving of food. Moreover, my invention permits the use of a variation in the gauges of metal used to meet the wide range of demands of the market in matters of size, type, weight and cost. My invention is particularly utilized in the production of utensils such as pots, kettles, casseroles, chafing dishes, steamers and the like.

A particular advantage of my utensil is its freedom from warping and blistering. The simple method of constructing my utensil eliminates all warping. And blistering is avoided by the rotation of the vessel during electroplating which insures an even deposit of copper and removal of gas bubbles from the vessel surface. As the copper layer is formed no gas is trapped between the copper and steel.

Thus it will be seen that in my invention there is had a utensil and method of producing the same in which the various objects hereinbefore set forth together with my thoroughly practical advantages are successfully achieved. It will be seen that the vessel is attractive, rugged and well adapted to handling in use, that it is calculated to be free of warping and blistering in use, and that it is designed to give uniform heating through all parts. Also, it will be seen that my utensil is produced in a simple, direct and efficient manner.

As many possible embodiments may be made of my invention, and as many changes may be made in the embodiment hereinbefore set forth, it is to be understood that all matter herein, whether described or illustrated, is to be interpreted as illustrative and not as a limitation.

Having described my invention, I claim:

The process of forming a culinary vessel compressing deep-drawing the vessel out of a tri-ply composite sheet of a thick layer of mild low carbon steel sandwiched between two thin layers of 18–8 chromium-nickel stainless steel to the shape of the desired vessel to give side walls and a bottom with 18–8 chromium-nickel stainless steel interior and exterior layers, cutting a shallow peripheral groove into said exterior 18–8 chromium-nickel stainless steel layer at about the junction of bottom and side walls, mechanically abrading and chemically passivating the surface beneath the groove, masking the side walls above said groove against plating, and rotating the shaped vessel at a linear velocity of about 6 feet per minute in a copper electroplating bath wherein the vessel is made the cathode and a plurality of copper bars serve as anodes, whereby a layer of copper is deposited on the portion of the outside surface in and below said groove while said vessel is continuously rotated to give a thickened bottom and thicker edge.

References Cited in the file of this patent

UNITED STATES PATENTS

| | | |
|---|---|---|
| 733,630 | Dana | July 14, 1903 |
| 1,293,562 | Siegel | Feb. 4, 1919 |
| 2,358,104 | Scavullo | Sept. 12, 1944 |
| 2,363,973 | Kennedy et al. | Nov. 28, 1944 |
| 2,549,610 | Kennedy et al. | Apr. 17, 1951 |
| 2,560,966 | Lee | July 17, 1951 |